Feb. 11, 1958   L. K. EDWARDS ET AL   2,822,755
FLIGHT CONTROL MECHANISM FOR ROCKETS
Filed Dec. 1, 1950

INVENTORS;
LAWRENCE K. EDWARDS
ARTHUR L. LOWELL
ALLAN J. SUMMERS

ATTORNEYS.

Feb. 11, 1958 L. K. EDWARDS ET AL 2,822,755
FLIGHT CONTROL MECHANISM FOR ROCKETS
Filed Dec. 1, 1950 3 Sheets-Sheet 2
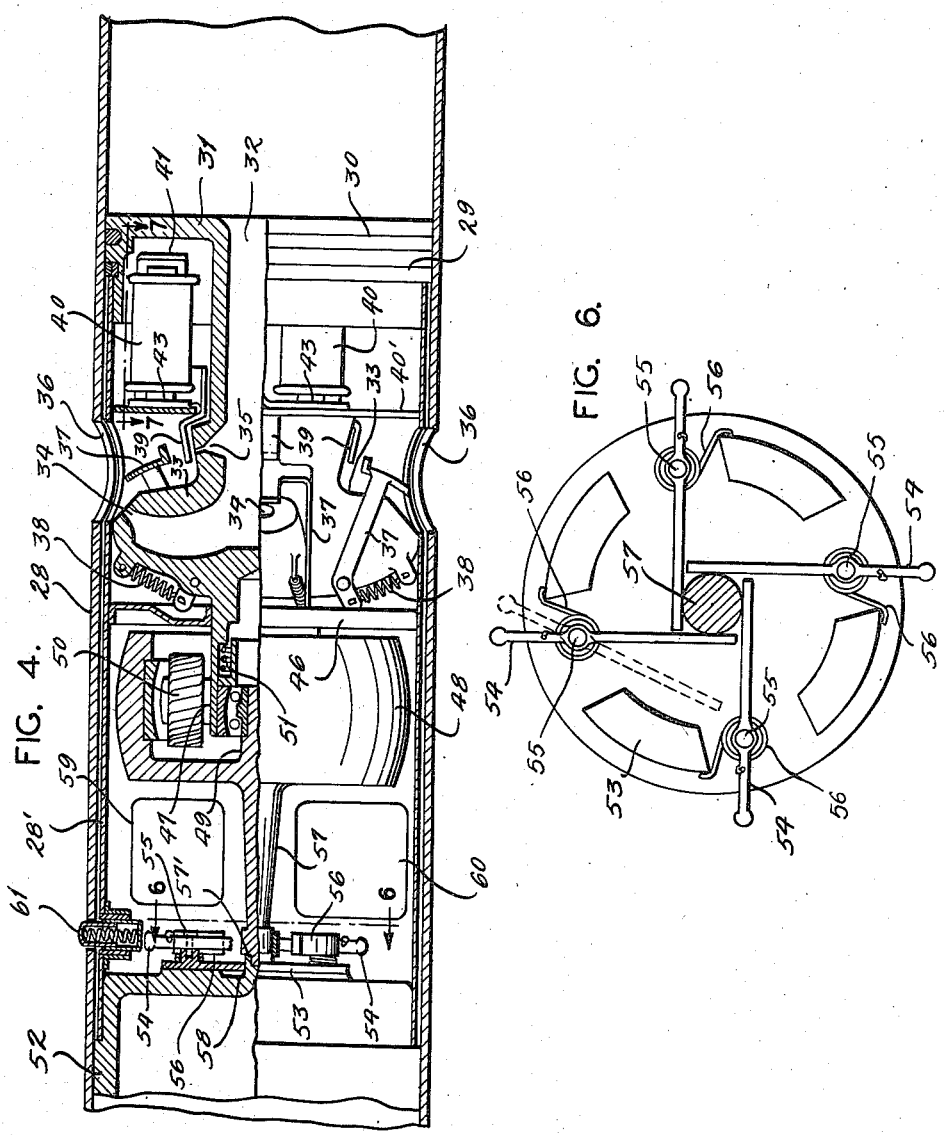
INVENTORS:
LAWRENCE K. EDWARDS
ARTHUR L. LOWELL
ALLAN J. SUMMERS
ATTORNEYS.

Feb. 11, 1958 L. K. EDWARDS ET AL 2,822,755
FLIGHT CONTROL MECHANISM FOR ROCKETS
Filed Dec. 1, 1950 3 Sheets-Sheet 3
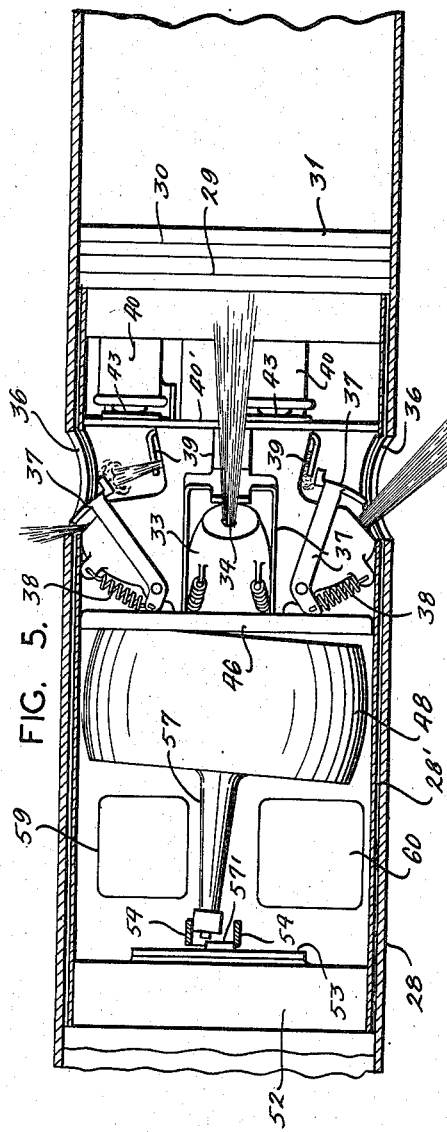
INVENTORS:
LAWRENCE K. EDWARDS
ARTHUR L. LOWELL
ALLAN J. SUMMERS
By Carr & Carr & Gravely,
ATTORNEYS.

United States Patent Office 2,822,755
Patented Feb. 11, 1958

2,822,755

FLIGHT CONTROL MECHANISM FOR ROCKETS

Lawrence K. Edwards, Glendale, and Arthur L. Lowell, Ferguson, Mo., and Allan J. Summers, Altadena, Calif., assignors to McDonnell Aircraft Corporation, St. Louis, Mo., a corporation of Maryland Application December 1, 1950, Serial No. 198,514

11 Claims. (Cl. 102—50)

This invention relates to jet propelled missiles and is more particularly directed to mechanism for causing the missile to maintain the desired heading regardless of the cooperation of external forces that would cause deviation from its intended path of travel.

One object of the invention is to provide a flight direction control mechanism for a rocket operable by gases derived from the rocket propellant.

Another object of the invention is to provide a gyroscope reference control mechanism for a plurality of jets for maintaining a rocket or missile on its intended heading or line of flight which is desirable for a high degree of accuracy.

A further object of the invention is to provide a flight control mechanism for self-propelled rockets controlled by a gyroscope for selectively interfering with the action of a series of jets in the sides of the missile for maintaining it on target or in a line parallel and close thereto.

The invention consists in the provision of a plurality of jets uniformly spaced about the periphery of a rocket that derive their gases from that propelling the rocket, the jets being selectively controlled by a gyroscope-actuated mechanism for rotating the rocket about its center of gravity, thus maintaining the rocket on or parallel to its intended heading.

Figure 2:
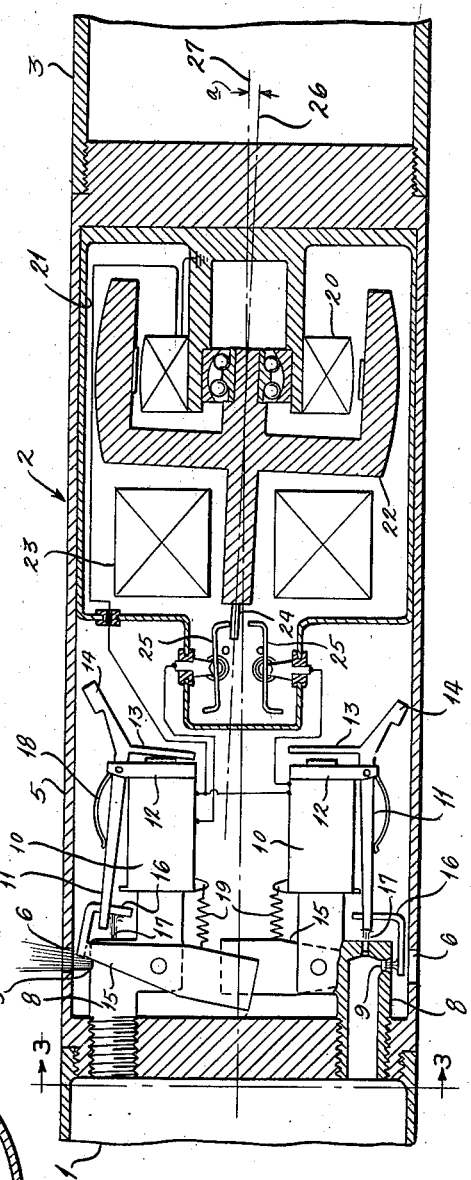
Fig. 2 is a sectional view taken along the line 2—2 of Fig. 1.
Figure 3:
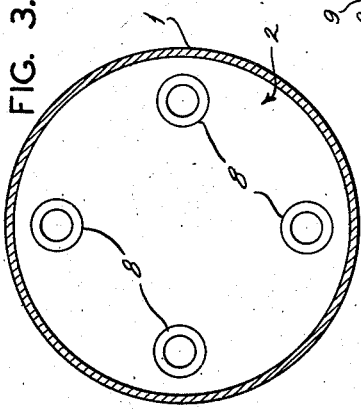
Fig. 3 is a sectional view taken along the line 3—3 of Fig. 2.

Fig. 4 is a sectional view similar to Fig. 2, showing a modified form of the invention, Fig. 5 is a view showing parts of Fig. 4 in operation, Fig. 6 is a sectional view taken substantially along the line 6—6 of Fig. 4, Fig. 7 is a view looking in the direction of the line 7—7 of Fig. 4; and Fig. 8 is a view of the device shown in Fig. 7 rotated 90°.

Figure 1:
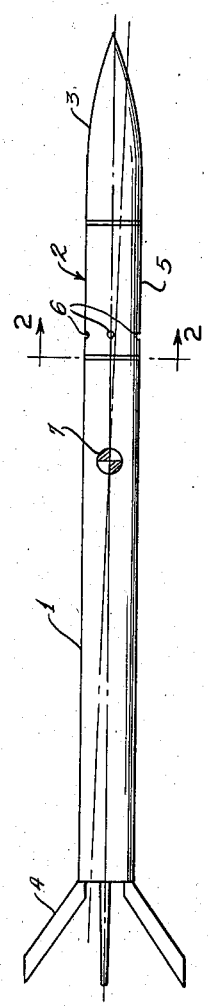
Fig. 1 is a view of a missile incorporating the invention.

The invention is embodied in the rocket or missile illustrated in Fig. 1 of the drawings in which the numeral 1 designates a casing having a propellent chamber therein. A stabilizer mechanism 2 is connected to the propellent chamber casing and a warhead 3 is secured to the stabilizer. Fins 4 are secured to the discharge end of the propellent chamber to prevent the rocket from being aerodynamically unstable.

The stabilizer 2 comprises a tubular member 5, one end of which is provided with a plurality of ports 6. These ports are spaced 90° apart and ahead of the center of gravity of the rocket indicated at 7. Four hollow members or plugs 8 are threaded into the dividing wall between the propellent chamber and the stabilizer, each hollow plug being provided with a discharge opening in the form of a nozzle 9 located in line with one of the ports 6 in the tubular member. An electromagnet 10 is mounted on each plug and provided with a lever 11 pivoted to a support 12 secured to the electromagnet. An armature 13 is integrally connected to the lever and a counterweight 14 is also provided on lever 11. A spoiler 15 is pivoted to each plug 8 and adapted to be aligned with nozzle 9. The spoiler deflects or blocks the gases issuing from the nozzle for the purpose of rendering the force of the jet ineffective. A bracket element 16 is connected to each of the spoilers 15, one arm of which is disposed opposite a corresponding auxiliary nozzle 17 in plug 8. The lever 11 is normally positioned opposite the auxiliary nozzle so that the jet issuing therefrom will not be effective on the bracket. A spring 18 normally urges the lever toward the electromagnet 10 and against the action of the force produced by the electromagnet. A coil spring 19 is connected between each electromagnet and its associated spoiler for normally holding the spoiler opposite the discharge nozzle 9.

Each of the electromagnets is capable of being energized from a generator 20 centrally disposed in one end of the stabilizing unit in casing 21. A gyroscope 22 of the run-down type is rotatably mounted within the generator support and controlled by a well-known inertia-actuated uncaging device 23. The device 23 holds the gyroscope axis parallel to the axis of the rocket until the launching acceleration occurs. The shaft of the gyroscope is provided with a pick-off member 24 positioned between the pivotally mounted pick-off arms 25, the latter being suitably mounted in the casing 21. Each of the pick-off arms is electrically connected to one of the electromagnets which, in turn, are connected to the generator 20. Each coil, as well as one side of the generator, is grounded, thus completing the electrical circuit therefor.

In the operation of the device the gyroscope 22 is brought up to speed before launching by external electrical power, the generator 20 functioning as a motor for this purpose. The gyroscope is uncaged at the beginning of the launching by the action of the acceleration of launching on the caging device 23. Thereafter the gyroscope axis remains parallel to its direction at the time of uncaging. During the rocket burning period, the hot gases from the propellent member 1 flow continuously through each of the control plugs 8, two of which are shown in one plane in Fig. 2 of the drawings. When the rocket is on its intended heading, no action of the stabilizing unit is necessary and, therefore, the flow of gases from each discharge nozzle 9 is spoiled by impingement against the spoiler 15 held in that position by springs 19.

Assuming that the line 26 is coincident with the intended heading of the rocket and that the rocket axis, indicated by the line 27, has deviated therefrom by angle $a$, the rocket will be displaced with reference to the gyroscope 22 and the pick-off member 24 will engage one of the pick-off arms 25, thus completing the electrical circuit through one of the electromagnets 10. This will energize the electromagnet, causing the lever 11 to move against the action of spring 18 and uncover the auxiliary nozzle 17. The gases issuing from the auxiliary nozzle will impinge against the bracket 16, thereby shifting spoiler 15 and permitting gas issuing from nozzle 9 to be discharged through its aligned port 6. The jet issuing from nozzle 9 creates a thrust which will rotate the rocket about its center of gravity 7 on an axis at right angles to the longitudinal axis of the rocket. When the longitudinal axis 27 of the rocket is aligned with the intended heading through the rotational axis of the gyroscope, the energized circuit to the electromagnet is broken, whereupon the spring 19 will re-position the spoiler 15 over the discharge nozzle 9 and lever 11 will be positioned opposite the auxiliary nozzle 17.

The above mechanism greatly increases the effectiveness of solid propellent rockets by lowering their dispersion and increasing the probability of direct hits for a given number of rockets launched against a target. The device is of particular value in connection with rockets launched from aircraft at high altitudes or from fixed surface launchers. Under prior conditions, the rockets launched from these positions were inaccurate and had a wide dispersion with respect to the target.

The device is also particularly applicable to rockets launched from aircraft at angles to the relative wind, including those launched rearwardly. No means is provided in existing rocket constructions for controlling the direction or stabilizing the heading of rockets launched at angles to the relative wind.

The rocket above described has a simple inexpensive mechanism and a higher degree of reliability under operating conditions that is now possible in other types of self-propelled missiles. It has no external aerodynamic surfaces and, therefore, possesses desirable logistical advantages, including adaptability for internal storage in a launching vehicle, ease of handling, and tube launching.

A modified form of the invention is illustrated in Figs. 4 through 8 in which the numeral 28 designates a portion of the casing for the rocket. The stabilizing mechanism for the rocket is secured in an auxiliary casing 28' fitted within casing 28. A snap ring 29 holds the auxiliary casing in position and is disposed in a suitable internal groove in casing 28 and in aligned groove in casing 28'. A seal 30 is provided for the purpose of preventing leakage of gases from the combustion chamber of the rocket into the stabilizing mechanism.

A casting or hollow member 31 is fitted within the auxiliary casing 28' and is provided with a central axial passage 32, which passage is in communication with the combustion chamber of the rocket. A seal 30 is received in a groove in the casting and at the opposite end thereof is a plurality of projections 33. These projections are spaced about the member and each is provided with a nozzle 34 in communication with passage 32. A booster nozzle 35 is also in communication with passage 32, the booster nozzle projecting a jet at substantially right angles to the axis of passage 32. The jet of nozzle 34 is discharged therefrom at about a 45° angle to the axis of the passage 32. The casings 28 and 28' have openings 36 therein through which the jets from the nozzle 34 pass. A spoiler 37 is pivotally mounted on each projection 33, with a spring 38 tending to rotate the spoiler away from the nozzle.

A spoiler 39 is located over the booster nozzle 35 and is actuated by a solenoid 40 secured to a suitable support 40' mounted in the auxiliary casing 28'. The solenoid is provided with an armature 41 to which the spoiler 39 is secured. The armature 41 is provided with a leaf spring 42 secured thereto which, in turn, is secured to a bracket 43 in which the solenoid is mounted, the entire assembly being disposed within casting 31. The spoiler 39 is integral with a plate 44 and is secured to leaf spring 42. Energization of the solenoid will move armature 41 toward it and simultaneously move the spoiler out of the path of the jet issuing from the booster nozzle 35, as illustrated in Fig. 5 of the drawings. The jet issuing from the booster nozzle impinges on the spoiler 37 for movement over the nozzle 34 against the tension of spring 38, thus interfering with the effectiveness of the jet issuing from nozzle 34. Each of the nozzles is provided with its own spoiler, a booster nozzle, and a solenoid for actuating the spoiler for the booster nozzle.

The forward end of the reduced diameter of the casting 31 extends through a baffle plate 46, constituting a support therefor. The forward end of the casting is suitably bored for receiving a universal bearing 47. The bearing rotatably supports the gyroscope 48 having a complemental bearing support 49 which extends into the universal bearing. The forward end also supports a plurality of generator windings 50, the associated windings for the generator being mounted in the gyroscope 48. The forward end of the casting is suitably bored for receiving a caging spring 51 acting on the bearing 47 for movement thereof away from the casting 31.

An adapter 52 is secured in the auxiliary casing 28' and is also fitted in casing 28. The war head of the rocket is located ahead of the adapter and a plurality of pick-off assemblies 53 (Fig. 6) are mounted on the adapter within the auxiliary casing 28'. Each pick-off assembly comprises an arm 54 rotatably supported on a pin 55. A spring 56 is wound about the pin for the purpose of holding arm 54 in contact with the stem 57 of the gyroscope 48 and with a projection 57' on the adapter 52. Each of the arms 54, therefore, is pressed by its spring 56 against projection 57' of adapter 52 but may be deflected therefrom by stem 57 of the gyroscope. Each arm 54 is electrically connected to a solenoid 40, in the manner shown in Fig. 2 for pick-off arms 25, and forms a part of the electrical circuit for the solenoids 40. The adapter 52 is also provided with a caging socket 58 (Fig. 4) in which the free end of stem 57 is received, the spring 51 normally moving the free end of the stem into the caging socket.

A rectifier 59 is mounted in the auxiliary casing 28' as well as a capacitor 60 for the generator, the capacitor providing excitation for the generator. Spring-pressed contacts 61 are provided in the auxiliary casing 28' extending through the casing 28, these contacts being connectable to an exterior source of power for bringing the gyroscope up to speed, the generator in connection therewith acting as a motor for this phase of its operation.

The gyroscope is brought up to speed after the rocket is placed in a launching tube. The charge in the combustion chamber is then fired which creates a gas under high pressure within the chamber, thus furnishing the means of propulsion for the rocket. A portion of the gas enters passage 32 for discharge through the nozzles 34 and 35, the nozzles being spoiled by the spoilers 37 and 39. The axis of the rocket is given its intended heading and, as the rocket leaves the launching tube, the gyroscope generator is uncaged by the movement of the gyroscope generator relative to the auxiliary casing 28', thereby releasing the stem 57 from the caging socket 58. In the event the axis of the rocket becomes displaced from the axis of the gyroscope generator stem 57, the circuits to one or more of the solenoids 40 will be closed, thus causing the armature associated with the energized solenoids to move the spoilers 39 out of the jets issuing from nozzles 35. These jets impinge upon the spoilers 37, thus lifting them upwardly against the tension spring 38 for spoiling the jets issuing from nozzles 34. The remaining jets issuing from nozzles 34 will tend to rotate the rocket about its center of gravity until the axis of the rocket is in alignment with the axis of the gyroscope generator, whereupon the solenoids will be de-energized, which will equalize the force of the jets issuing from nozzles 34. The thrust produced by the jets issuing from nozzles 34 contributes to the forward thrust developed by the gases issuing from the propulsive jets of the rocket, thereby causing an increased over-all thrust on the rocket. Upon selective spoiling, these jets will restore the rocket to its intended heading. While the rocket will not be restored to its original line of flight, it will, after correction, proceed in a path substantially parallel to its initial heading. Fig. 5 of the drawings illustrates the relative rotative movement of the rocket about its center of gravity by means of the jets issuing from one or more of the nozzles 34.

What we claim is:

1. A stabilizing device for self-propelled missiles comprising a tubular casing provided with a propellent chamber, a plurality of uniformly circumferentially spaced members supported by said casing, each member being provided with a passage opening to said propellent chamber and having a nozzle adapted to discharge radially outwardly and a second nozzle discharging axially of said casing, a spoiler for each of said radial nozzles pivotally mounted on its respective member, pivotally mounted spoiler means opposite each of said second mentioned nozzles, means for actuating each of said pivotally mounted spoiler means for permitting gases issuing from said axial nozzle to be unopposed, an element on each of said spoilers positioned adjacent a corresponding one of said second mentioned nozzles and adapted to be impinged by the issuing jet to move said spoiler away from a position over said radially outwardly discharging nozzle; and means for selectively actuating any one of said pivotally mounted spoiler actuating means in order that the jet issuing from the uncovered radially outwardly discharging nozzle will cause the missile to retain its intended heading.

2. A stabilizing device for a self-propelled missile comprising a tubular casing provided with a propellent chamber, a plurality of uniformly spaced members supported by said casing, each member having a passage opening to said propellent chamber and being provided with a nozzle for projecting a jet radially outwardly and a nozzle for projecting a jet axially, said nozzles in each member being in communication with said propellent chamber through said passage, a spoiler carried by each member for each radial jet and a bracket carried thereon disposed in position opposite said axial jet, separate movable spoiler means in said casing adapted to assume normal positions aligned with said axial jet projecting nozzle for preventing the corresponding axial jet acting on its associated bracket, means for actuating each of said last mentioned spoiler means out of normal position so that the corresponding axial jet will impinge on said bracket and move said spoiler carrying said latter bracket away from the radial nozzle for causing said radial jet to place the missile axis on its intended heading; and means connected with said actuating means and being responsive to flight deviations for selectively actuating each of said last mentioned actuating means.

3. A stabilizing device for self-propelled missiles comprising a tubular casing provided with a propellent chamber, a plurality of hollow members uniformly circumferentially spaced thereon and disposed forwardly of the center of gravity of said missile, each member provided with a nozzle communicating with the propellent chamber for projecting a jet radially outwardly and a second nozzle communicating also with the propellent chamber for projecting an axial jet, a spoiler pivotally mounted on each of said members having a portion aligned with said radial nozzle provided therein and a second portion opposite said axial nozzle provided therein, means movably mounted in said casing in position normally for preventing said axial jet issuing from said second nozzle from acting on said second portion, a selectively energizable electromagnet for actuating each of said last mentioned means out of normal positions so that said radial jet may rotate the missile about its center of gravity in a direction for causing its heading to be the same as its intended heading; and means responsive to deviations in heading for selectively actuating each of said electromagnets.

4. A stabilizing device for a rocket carrying its own propellant supply for free flight comprising a plurality of primary nozzles circumferentially disposed about the interior of the rocket and each communicating with the propellant supply to discharge a jet of propellant to generate a stabilizing force on the rocket for maintaining the rocket course, spoiler means movably mounted in the rocket to intercept a jet of propellant issuing from each primary nozzle, an auxiliary nozzle for each primary nozzle, each of said auxiliary nozzles being supplied with propellant and being arranged to direct the propellant jet issuing therefrom toward the spoiler means for said primary nozzles, an auxiliary spoiler disposed in the rocket for each auxiliary nozzle; and gyroscopic controlled means connected to and adapted for selectively actuating said auxiliary spoilers for said auxiliary nozzles.

5. A stabilizing device for maintaining the path of travel of a rocket carrying its own propellant supply for free flight, said device also being carried by the rocket and comprising a plurality of nozzles circumferentially disposed about the rocket in each of four quadrants and each open to the flow of propellant to generate a stabilizing force, a spoiler for each nozzle jet mounted in the rocket to move into and out of a position adaptable for blocking the propellent jet issuing from the nozzle, an auxiliary propellent discharge nozzle for each nozzle, a spoiler for each auxiliary nozzle jet movable in the rocket into and out of a position blocking the jet issuing from each auxiliary nozzle, the auxiliary nozzle jet when unblocked actuating the cooperating spoiler for the propellent jet issuing from each nozzle; and electro-magnetic means in the rocket adapted for selectively actuating each spoiler for the auxiliary nozzle for unblocking and causing the unspoiled jets to actuate said first mentioned spoilers, whereby the unblocked propellent jet generates a force on the rocket in a direction for causing the rocket to travel in a path parallel to its intended heading.

6. A stabilizing device for a rocket comprising a housing having a bore in communication with the burning chamber of the rocket, a plurality of radial projections each provided with a bore opening outwardly and constituting primary nozzles in communication with said housing bore, auxiliary bores in said housing opening outwardly and constituting auxiliary nozzles, a spoiler movably mounted in the housing adjacent each primary nozzle and in position to be actuated by the jet from an adjacent one of the auxiliary nozzles, an auxiliary spoiler movably mounted adjacent each auxiliary nozzle, a gyroscope generator operatively mounted in the housing for the rocket; and selectively operable means controlled by said gyroscope generator for operating said auxiliary nozzle spoiler means to release an auxiliary nozzle jet to actuate said adjacent movable spoiler for, in turn, unblocking the primary jet controlled thereby to rotate the rocket about its center of gravity in a direction for placing the longitudinal axis thereof parallel to the intended heading.

7. A stabilizing device for a rocket comprising a housing having a bore in communication with the burning chamber of the rocket, a plurality of radial projections on said housing in communication with said bore, the axes of the openings in said projections being disposed at an angle to the longitudinal axis of the rocket, a spoiler movably mounted on said housing for each nozzle, auxiliary nozzles opening from said housing adjacent said radial projections, each of said movable spoilers being positioned to be actuated into spoiling position by a jet issuing from an auxiliary nozzle in communication with said bore, an auxiliary spoiler for each auxiliary nozzle, a gyroscope generator rotatably mounted on said housing; and means operable by said gyroscope generator responding to deviations in rocket heading for selectively actuating the auxiliary spoilers for the auxiliary nozzles for maintaining the rocket in a path parallel to its intended heading.

8. A stabilizing device for a rocket comprising a housing having a bore in communication with the burning chamber of the rocket, a plurality of radially and rearwardly extending projections thereon, each projection having a bore in communication with said housing bore and an opening near one end of the bore in the projection constituting a primary nozzle, said housing having auxiliary nozzle openings communicating with the bore therein, each auxiliary nozzle being located adjacent a primary nozzle, a spoiler movably disposed in the rocket in position to spoil the jet from said primary nozzle, an independently movable spoiler for the auxiliary nozzle, the jet issuing from said auxiliary nozzle having a direction adapted for actuating the primary nozzle spoiler into the path of the jet from the primary nozzle, electromagnetic means for independently actuating the spoiler for each of said auxiliary nozzles, a gyroscope generator; and means actuated by power from said gyroscope generator for selectively actuating each of said electromagnetic means.

9. A stabilizing device for a rocket comprising a housing having a bore in communication with the burning chamber of the rocket, a plurality of radially and rearwardly extending projections thereon, each projection having a bore in communication with said housing bore and an opening leading from the projection bore constituting a primary nozzle, said housing having auxiliary nozzle openings communicating with the bore therein, each auxiliary nozzle being located adjacent a primary nozzle, a spoiler movably disposed on the housing for spoiling the jet issuing from said primary nozzle, an independently movable spoiler for the auxiliary nozzle, the jet issuing from said auxiliary nozzle having a direction adapted for actuating the primary nozzle spoiler into the path of the jet from the primary nozzle, electromagnetic means for independently actuating the spoiler for each of said auxiliary nozzles, a gyroscope generator, a stem on said gyroscope generator; and a plurality of switches in said rocket adapted to be selectively actuated by said stem for selectively controlling said auxiliary nozzle spoiler, causing the rocket to rotate about its center of gravity for causing the longitudinal axis thereof to remain parallel to its intended heading.

10. A stabilizing device for a rocket comprising a housing having a bore in communication with the burning chamber of the rocket, a plurality of radially and rearwardly extending projections thereon, each projection having a bore in communication with said housing bore and an opening leading from the projection bore constituting a primary nozzle, said housing having auxiliary nozzle openings communicating with the bore therein, each auxiliary nozzle being located adjacent to and aligned with the primary nozzle in an adjacent one of said projections, a spoiler pivoted on said housing in position to spoil the jet issuing from said primary nozzle, a separate pivoted spoiler for the auxiliary nozzle, the jet from said auxiliary nozzle actuating the primary nozzle spoiler into the path of the jet from the primary nozzle, electromagnetic means for actuating the spoiler for each of said auxiliary nozzles, a gyroscope generator, a stem on said gyroscope generator; and a plurality of pivotally mounted switches in said rocket adapted to be selectively operated by said stem for selectively controlling said auxiliary nozzle spoiler, causing said rocket to rotate about its center of gravity, thereby causing the longitudinal axis of the rocket to remain aligned with its intended heading.

11. A stabilizing device for a rocket comprising a housing having a bore in communication with the burning chamber of the rocket, a plurality of radially and rearwardly extending projections thereon, each projection having a bore in communication with said housing bore and having an opening near an extremity thereof constituting a primary nozzle, said housing having other bores therein communicating with the burning chamber through said housing bore, and each aligned with said projections constituting an auxiliary nozzle, a spoiler pivoted on said housing adjacent each of said primary nozzles, a spoiler movably mounted in the rocket adjacent each of said first mentioned spoilers and normally operable for spoiling the jet from the adjacent auxiliary nozzle, the jet therefrom when unspoiled actuating the primary nozzle spoiler into the path of the jet from the primary nozzle, electromagnetic means for actuating the spoiler for each of said auxiliary nozzles out of normal spoiling position, a gyroscope generator, a stem on said gyroscope generator adapted to operate said electromagnetic means selectively; and means for locking said gyroscope generator in position which will allow axial motion thereof relative to said rocket for permitting said stem to move freely.

References Cited in the file of this patent
UNITED STATES PATENTS

| | | |
|---|---|---|
| 1,117,843 | Helfrich | Nov. 17, 1914 |
| 1,838,354 | Bauer | Dec. 29, 1931 |
| 2,414,103 | Hunter | Jan. 14, 1947 |
| 2,419,164 | Putman et al. | Apr. 15, 1947 |
| 2,584,127 | Harcum et al. | Feb. 5, 1952 |

FOREIGN PATENTS

| | | |
|---|---|---|
| 139,856 | Great Britain | Mar. 18, 1920 |
| 879,835 | France | Mar. 5, 1943 |
| 579,816 | Great Britain | Aug. 16, 1946 |

OTHER REFERENCES

Article in the magazine Flight, entitled German Long-range Rocket Development, issue of November 8, 1945, pp. 508, 509, 511.